UNITED STATES PATENT OFFICE.

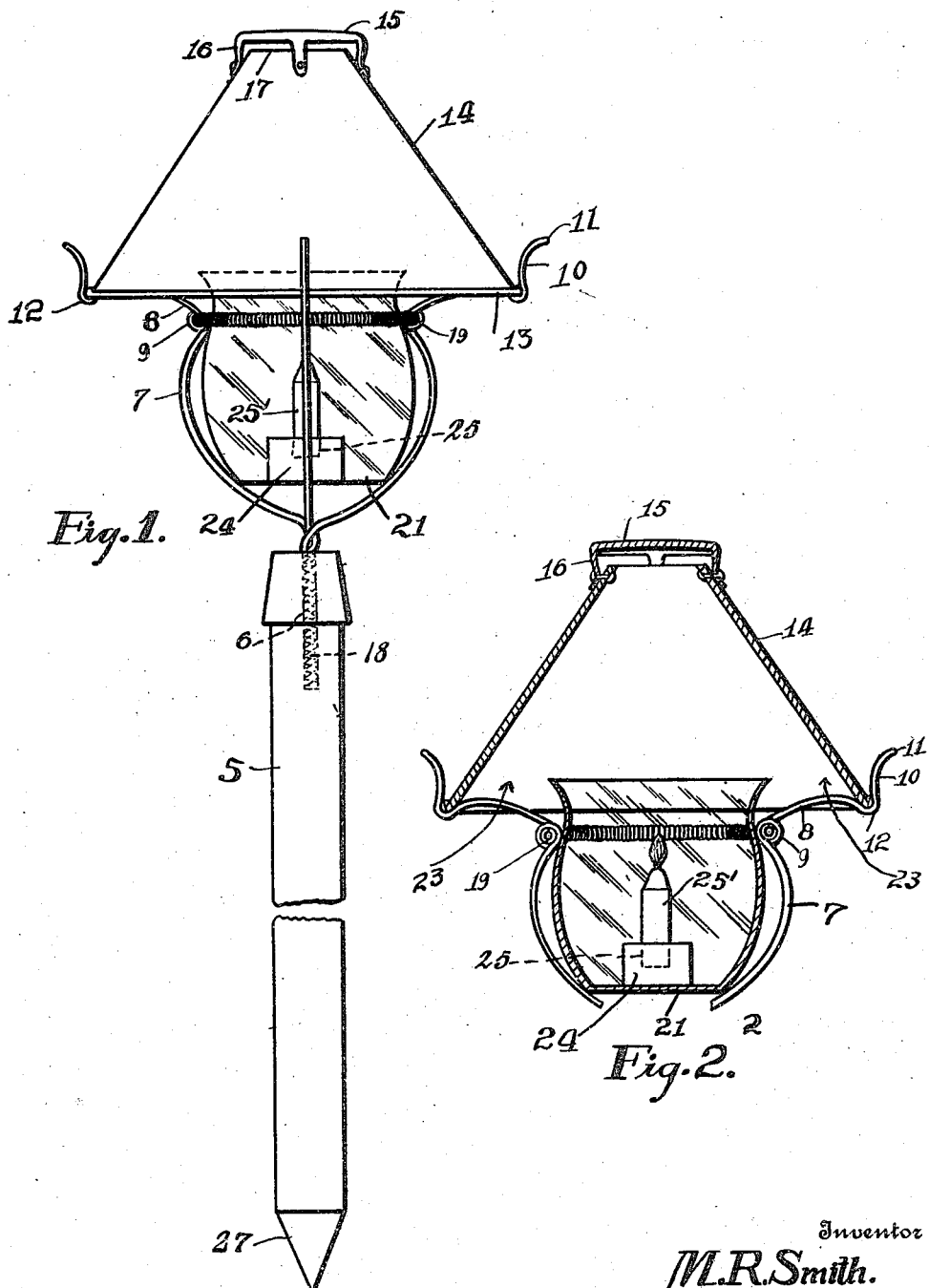

MOSES ROSS SMITH, OF MADISONVILLE, KENTUCKY.

LAMP.

1,322,969.	Specification of Letters Patent.	Patented Nov. 25, 1919.

Application filed September 3, 1919. Serial No. 321,345.

*To all whom it may concern:*

Be it known that I, MOSES R. SMITH, a citizen of the United States, residing at Madisonville, in the county of Hopkins and State of Kentucky, have invented a new and useful Lamp, of which the following is a specification.

This invention has reference to insect traps, and more particularly to traps to be placed in fields and used for catching flying insects, which destroy crops of vegetation, such as tobacco and cabbage.

The primary object of the invention is to provide a device of this character wherein the insects are attracted thereto by means of a light, thereby eliminating the use of bait.

A still further object of the invention is to provide a combined lamp and cover supporting means.

With the foregoing and other objects in view which will appear as the description proceeds, the invention resides in the combination and arrangement of parts and in the detail of construction hereinafter described and claimed, it being understood that changes in the precise embodiment of the invention herein disclosed, may be made within the scope of what is claimed without departing from the spirit of the invention.

Referring to the drawing:—

Figure 1 illustrates a side elevational view of the trap, together with the supporting stick thereof.

Fig. 2 illustrates a longitudinal sectional view through the shade and globe of the trap, the supporting stick being removed.

Referring now to the drawings in detail, the reference character 5 designates the support for the lamp, the same having a bore formed longitudinally of the handle, and extending from one end thereof and terminating at a point a short distance from the end, as at 6.

The combined lamp and cover support includes a plurality of resilient wire members 7, each of which is curved outwardly as at 8, the upper portion of each of said wire members being formed into a loop as at 9, for purposes to be hereinafter more fully described, the upper end of each of said wire members 7 extends laterally and is curved inwardly as at 10, the extreme end thereof extending outwardly as at 11 to provide a guide for positioning the cover on the laterally extending portion, just below the inwardly extending portion 10 thereof.

As shown, the portion 12 of each of the resilient wire members 7 provides a shoulder for receiving the lower edge of the cover 13, which includes the tapering walls 14, and the cap 15, which cap is provided with depending legs 16 whereby the same is secured to the open top 17 of the cover 13, which is substantialy cone-shaped.

The lower ends 18 of each of the supporting members, extend downwardly and are wrapped around each other as at 19, to provide a support for the wire members 7, the lower ends 18 being positioned within the bore 6 of the upper end of the support.

The coil spring 19, extends through the loop portions 9 of the supporting members, the ends thereof being connected as at 20, for lending resiliency to the supporting member 7, and at the same time restricting the lateral movement thereof, in order that the lamp may be properly supported thereby.

Positioned under the cover 13, and engaged by the loop portions 9 of the supporting members, the same extending above the coil spring 19, is the lamp casing 21, which as shown is in the form of a globe made preferably of glass, the upper edge of said globe extending outwardly as at 22, the same being supported in spaced relation with the cover 13, to provide the passageway 23, between the upper edge of the lamp casing 21 and the inner edge of the cover 13.

As clearly shown by Fig. 2 of the drawing, the lamp includes a substantially square block 24, which is provided with an opening 25 extending from the upper edge thereof and terminating at a point adjacent the bottom of the block.

In operation the block 24 is positioned within the lamp casing 21, the substantially flat bottom thereof resting on the substantially flat bottom 26 of the lamp casing 21.

Positioned within the opening 25, is a candle 25', which provides the light, in operation, for attracting the flies or other insects, which destroy the vegetation.

The operation of the device is as follows:

The support 5 carrying the combined light and trap, is positioned within the field, by forcing the lower pointed end 27 into the ground surface of the field in which the same is to be located, and when it becomes dark, the light within the lamp casing 21 is lighted, with the result that the flies and insects are attracted thereto. It follows that when the flies reach the light, they crawl over the surface of the lamp casing 21 and under the cover 13, through the passage way 23, where they are trapped.

While I have shown a candle, in use as the lighting element of my invention, it is obvious that a small lamp of any kind, may be used, if found desirable.

Having thus described my invention, what I claim is:—

1. In an insect trap, a supporting rod, a plurality of curved supporting members having right angled portions terminating in upwardly extending end portions, a substantially cone shaped cover supported by the supporting members, a lamp casing supported by the supporting members, the upper edge thereof being disposed in spaced relation with the cover, and means for tensioning the supporting members, to restrict lateral movement thereof.

2. In an insect trap, a supporting rod, a plurality of supporting members including resilient wire members, each of said wire members being provided with a loop portion, right angle supporting members formed integral with the resilient wire members, a substantially cone shaped cover supported by the right angle supporting members, a coiled spring extending through the loop portions of the supporting members, for restricting lateral movement of the supporting members, and a lamp casing embraced by the upper edge of the loop portion.

3. In an insect trap, a supporting rod, resilient supporting members having their lower ends wrapped around each other to provide a supporting shank, said supporting rod having an opening in one end thereof to receive the supporting shank of the supporting members, each of said supporting members including a curved wire having a loop portion adjacent the upper end thereof, right angle portions formed on the supporting members, a substantially cone shaped cover positioned on the right angle portions, a globular transparent lamp casing supported within the supporting members, and in spaced relation with the cover, and means extending through the loop portions of the supporting members for restricting lateral movement thereof.

In testimony that I claim the foregoing as my own, I have hereto affixed my signature in the presence of two witnesses.

MOSES ROSS SMITH.

Witnesses:
J. B. STANLEY,
S. MELTON.